United States Patent [19]

Berntsson et al.

[11] 4,157,998

[45] Jun. 12, 1979

[54] METHOD OF PRODUCING A CEMENT MORTAR WITH GOOD STABILITY IN A FRESH CONDITION AND A METHOD USING THIS MORTAR AS A BINDING AGENT OF PRODUCING A LIGHTWEIGHT AGGREGATE CONCRETE WITH A HIGH AGGREGATE CONTENT

[75] Inventors: Leif Berntsson; Bengt Hedberg, both of Goteborg; Sören Karlsson; Olof Magnusson, both of Karlskoga, all of Sweden

[73] Assignee: AB Bofors, Bofors, Sweden

[21] Appl. No.: 864,035

[22] Filed: Dec. 23, 1977

[30] Foreign Application Priority Data

Dec. 23, 1976 [SE] Sweden .............................. 7614518

[51] Int. Cl.$^2$ .............................................. C04B 7/35
[52] U.S. Cl. .................................. 260/42.13; 106/90; 106/96; 106/97; 260/29.6 S
[58] Field of Search ....................... 260/29.6 S, 42.13; 106/90, 96, 97

[56] References Cited

U.S. PATENT DOCUMENTS

| 2,514,021 | 7/1950 | Abraham .............................. 106/96 |
| 2,868,753 | 1/1959 | Morgan et al. ........................ 106/90 |
| 3,758,319 | 9/1973 | Ergene ................................. 106/90 |
| 3,955,992 | 5/1976 | Roberts ................................ 106/90 |
| 4,002,713 | 1/1977 | Duncan et al. .................... 260/29.6 S |
| 4,011,355 | 3/1977 | Mandish et al. ..................... 106/90 |
| 4,040,855 | 8/1977 | Rady-Pentek et al. .......... 260/29.6 S |
| 4,057,526 | 11/1977 | de Rook ............................. 260/42.13 |
| 4,070,199 | 1/1978 | Downing et al. .................. 260/42.13 |

FOREIGN PATENT DOCUMENTS 1093094  11/1967  United Kingdom .................. 260/42.13

*Primary Examiner*—Ronald W. Griffin
*Attorney, Agent, or Firm*—Pollock, Vande Sande and Priddy

[57] ABSTRACT

The present invention relates to a method of producing a cement mortar with a density of 1200-2000 kg/m$^3$ with good stability in a fresh condition. According to the invention, this good stability in the mortar is achieved through an extremely fine-pored structure initiated by fine-particle material with certain fixed properties added to the fresh mortar. The invention also comprises a method, using said mortar as a binding agent, of producing a lightweight aggregate concrete with an aggregate content of 45-80 percent by volume and a density below 1400 kg/m$^3$ where the aggregate material has a particle density of less than 1200 kg/m$^3$ and the mortar entirely fills out the space between the aggregate particles.

28 Claims, 3 Drawing Figures

METHOD OF PRODUCING A CEMENT MORTAR WITH GOOD STABILITY IN A FRESH CONDITION AND A METHOD USING THIS MORTAR AS A BINDING AGENT OF PRODUCING A LIGHTWEIGHT AGGREGATE CONCRETE WITH A HIGH AGGREGATE CONTENT

BACKGROUND OF THE INVENTION

The word cement is used here in its wider sense, and thus comprises, in addition to Portland cement, hydraulic binding agents such as aluminate cement, slag cement etc.

According to the information sheet B8:1973 published by "Byggforskningen" ("Construction Research") and entitled "Betongtillsatsmedel" ("Concrete Additives") hitherto known concrete additives can be divided up into a plurality of different groups, of which the first two are "Luftporbildande tillsatsmedel" ("Air-entraining additives") and "Vattenreducerande (plasticerande) tillsatsmedel" ("Water-reducing (plasticizing) additives").

The present invention relates to these two groups, although it can still not be referred entirely to one or the other or to both.

A fresh cement-based binding agent mixture (cement mortar or concrete mass) consists of solid particles, water and air. The cement-bonded concrete, which from the point of view of volume has the largest share within the construction industry, substantially consists of approx. 100 liters of cement, 200 liters of water, 650 liters of stone material, all of which with a diameter of less than 4 mm is usually designated sand, and the remainder stone, and 50 liters of air, counted on 1000 liters of fresh concrete mass. Of the 200 liters of water which is required in order to make it possible to process the mixture, approx. 60 liters is bonded chemically in the hardened cement paste, while the remaining quantity is bonded physically as gel and capillary water.

The solid particles comprised in the cement mortar or the concrete consist of aggregate, i.e. stones and sand of various fractions, the actual cement grains, and hydratation products precipitated in water. The cement grains react with parts of the water mixture to form a hydratation product which consists of a colloidal glue, the cement gel. The remaining water and the air are distributed in the basic mass formed by cement gel and aggregate. In the fresh mortar, the water will be found in the form of menisci in the cavities between solid cement and aggregate particles in their vicinity, while the air, in turn, forms pores between these particles and the water menisci. The particle size of the previously mentioned precipitated hydration products is within the Ångström range, while the mean grain size of the cement grains is approx. 5 $\mu$m. The sand and other aggregate material, finally, can have a particle size from approx. 0.1 mm up to one or a few centimeters. If no special measures are taken, a fresh cement mortar will have an air content of between 1.5 and 3.5 percent by volume. In the hardened cement-bonded mass, there are both air and water-filled pores. In addition to these pores, the size of which in a well packed cement-bonded mass is between $10^{-1}$ and 1 mm, also so-called capillary pores are formed, with a pore size of $10^{-4}$ to $10^{-2}$ mm and in the hardened cement gel so-called gel pores with a pore size of approx. $10^{-6}$ mm.

The size and quantity of the gel pores can be influenced only to a little extent via the water content of the original mixture, while on the other hand, the capillary pores are determined by the water cement ratio. A great many different ways of increasing the air pore content in fresh cement or concrete mass is described in literature.

In the Construction Research Brochure it is stated that such air entraining agents increase the total air content in the fresh cement or concrete mixture, and also cooperate towards a more uniform distribution of the air pores in the basic mass, at the same time as, to a certain extent, one obtains an increase of the content of small air bubbles, i.e. bubbles with a diameter of between 0.05 and 0.5 mm. As long as these finely distributed air bubbles exist, this gives the fresh mass an improved stability, which also contributes towards less water separation. If it is primarily desired to improve the stability of the fresh mass, without any requirements other than a certain air content, according to generally known technology, it is sufficient to dose for an air content of 3.0–4.0%. An increased admixture of air also has a certain improving effect on the flow of the fresh mass, as the air pores give rise to less friction between the solid particles in the mass, and thereby make this easier to work with. However, high contents of solid fine material at an increased air content are considered to give a tough, sticky concrete. As the consistency of a cement or concrete mass as a rule is used as a basis, the water content of the mixture can usually be lowered by an admixture of an air-entraining agent. According to a rule of thumb given in literature, it should be possible to reduce the water content in fresh cement mortar, with unchanged consistency, by one-half of the air content increase achieved through the addition of an air-entraining agent. Together with the previously mentioned reduced water separation, an increase of the quantity of fine air pores in the basic mass also involves that large aggregate particles are not as easily separated out of the fresh mixture. However, the changes in consistency hereby achieved are comparatively limited, as they are directly dependent on the quantity of stable air which in this way can be drawn into the mass. However, the perhaps most common reason for adding air-entraining agent is that it is desired to make the hardened mass more resistant to frost, since the cavities achieved by the addition of air-entraining agent will be available as expansion chambers for other water existing in the pore system when this increases its volume in connection with its freezing. The walls of the pores are hereby prevented from being broken when the ambient temperature falls below the feezing point. An air pore volume of approx. 5 percent by volume is considered to give a maximum resistance to frost, and this can comparatively easily be achieved. As long as the strength of any aggregate material is greater than that of the stiffened cement paste, the strength of this will determine the strength of the mass. The properties of the hardened mass will to a very great exgent be dependent on the water and air content of the original mixture. A plurality of different materials has been used as air-entraining agents, such as saponified resins, alkyl aryl sulfonate, calcium ligno sulfonate and hydroxy ethyl cellulose, in combination with tensides. From the point of view of functioning, these additives are based upon the fact that with the aid of the foaming agents comprised in them, a more or less stable foam is built up, with the aid of which increased quantities of air can be introduced into a fresh cement or concrete mass. The air pores hereby initiated will substantially be of the magnitude of 0.1–1 mm. These additives make it possible to manufacture cement mortar and concrete with a reduced density. However, foam bubbles of this size have poor own strength, and the pore system hereby built up can therefore collapse before the cement bonding agent has had time to harden. This applies particularly when it is desired to introduce large quantities of air. The mainly hydrophilic nature of the additives can also contribute towards an increased water absorption in the hardened mass. Through the addition of only tensile (either anion active or non-ion active) it is also possible, within certain limits, to change both the consistency and the quantity of the air comprised in a fresh cement composition. However, regardless of the type of tenside which has been used, this procedure has proved to be very sensitive as regards the quantity of tenside added, which at the most should comprise one or a few per mille of the entire mixture. The tensides used in this connection are highly effective, and can rapidly give a great quantity of air bubbles. However, the stability of these varies considerably. As a rule, anion active tensides lower the surface tension drastically when small quantities are added, while the non-ion active tensides have a somewhat lesser effect with one and the same concentration. With these two types of tensides, however, particularly at an over-dosing, the air bubbles generated from the beginning are rapidly recombined, i.e. they join together to form larger units. Particularly with the anion-active tensides, this recombination can take place to such an extent that air leaves the system, and a collapse occurs, i.e. the fresh mixture shrinks. Certain non-ion active tensides show considerably better stability, and therefore a greater tolerance towards over-dosing, but it is very noticeable, however, that recombination increases at e.g. more intensive stirring. Nor is it possible through regulating of such parameters as the choice of type of stirrer, the quantity of tenside added, and the intensity of the stirring, to control the quantity of air mixed in or the size of the air pores, which will vary between 0.1 and several mm.

When additives of the kind described above are used, the intention can be to mix in air, or that it is desired not to add more air to a concrete mixture. Through the choice of type of tenside and the quantity added, both of these effects can be achieved. In the Swedish published application No. 333 113, it is described how, through the addition of various tensides plus a styrene acrylate dispersion, the workability and flow of a concrete mixture increases. As this addition permits a considerable reduction of the water cement ratio of the fresh mixture, the hardened concrete mixture can be given a more compact structure and, consequently, increased strength. It is said that the dispersion in question, notwithstanding a high content of tensides, does not have any foaming capability. It is also particularly pointed out that it does not give rise to any formation of air pores. However, the quantity of tensides added and the quantity of acrylonitrile comprised in the polymer will make the hardened concrete highly hydrophilic.

In the Swiss patents Nos. 493,438 and 515,862 cement and concrete additives are described consisting of polymer or natural latex dispersions containing water, to which in addition to polymer components and emulsifiers, also an anti-foaming agent has been added.

Further, in the U.S. Pat. No. 3,819,391, an air-entraining cement additive has been described, consisting of a free-flowing flaky solid product containing 12.5–37.5 percent by weight of a bituminous substance and the remainder, 87.5–62.5 percent by weight, of a surface-active substance. In this additive, the major portion thus consists of the surface-active substance.

The Swedish patent application 7600161-9 relates to a development of the additive according to the above-mentioned U.S. patent, here in the form of a powder-formed product, soluble in water, which to 40–60 percent by weight is built up of the above-mentioned bituminous substance and a surface-active substance, while the remaining 60–40 percent by weight consist of polyethylene oxide resins, lignol sulfonates and diatomaceous earth. As a surface-active agent it is said that both anion, cation and non-ion agents can be used, but that a mixture is preferred. It is stated that the bituminous material may be asphalt, coal tar or derivatives thereof. In order that it may be used in this connection, however, it is a requirement that the substance in question shall be a liquid at room temperature. In addition to its air-entraining function, it is said that the additive also has a binding-retarding effect on the cement.

In the Swedish patent application No. 74.03454-7, it is also shown how, with the aid of colloidal silica, surface-active substances and amphiphilic substances or hydrocarbons, the consistency, workability and uniform distribution of the fine portion of the cement can be changed. In a table on page 6, the great importance of the water cement ratio is shown. When, with the aid of an additive, more air is introduced into the concrete, the water content can be reduced at the same time. The greatest reason for the increase in strength reported in the application must presumably be ascribed to the reduced water content. However, it should be possible to refer a complementary effect to the silica which is chemically active in connection with the hardening of the cement.

As indicated by the above-mentioned review of at least some of the concrete additives which have previously been proposed, there is nothing new in endeavouring to manipulate the structure of a fresh cement composition through miscellaneous additives, which primarily have an, albeit limited, effect of drawing in air. The fact that at least some of these air-entraining agents have also had a tendency to increase the content of fine air pores in the mixture is likewise previously known. In general, however, these older types of air-entraining agents have also given rise to large quantities of comparatively large pores, i.e. pores with a size of 0.1–1.0 mm and more.

SUMMARY OF INVENTION

The present invention now relates to a method of initiating an extremely fine and uniformly pored structure in fresh cement mortar. This special pore structure is achieved by a fine-particle material with a certain particle size and form and with certain defined surface properties being incorporated into the fresh mortar. These specific properties give the material in question a marked capability of entraining air, together with the capability of holding the air which has been drawn in together in extremely fine and stable bubbles, which during the working of the mortar are distributed in this, without being recombined with each other. In this way, an extremely fine-pored mortar is obtained. The properties characteristic of the particle-formed material include the fact that the individual particles show hydrophilic and hydrophobic properties concentrated to the respective particle surface, which in a certain way have been balanced off in relation to each other. This combination of properties contradictory to each other obviously makes it possible for the particles in question to divide up large water menisci into smaller ones.

We have not been able to find any other explanation as to why a hardened cement mortar, produced in accordance with the invention, can show a pore structure in which the major portion of all pores are within the size range of 5-30 μm. Otherwise, large pores, achieved by large water menisci are very common. The pore structure of the hardened mortar has been measured in a scanning microscope. In the fresh mortar, this can be more difficult, but if no collapse of the pore system occurs before the hardening, the pores of the fresh mortar correspond to the pores of the stiffened mortar, but with the difference that part of the pores in the fresh mortar are filled with water.

The method according to the invention thus offers a method of producing a fresh cement mortar which, notwithstanding such an extreme air content as up towards 40 percent by volume, nevertheless has a very good stability. This good stability makes its possible to mix in considerably greater quantities of aggregate of another density into the mortar than would previously have been possible in practice. In a mortar with less good stability, the lightweight aggregate would have time to float up, and the really heavy aggregate would sink to the bottom before the mortar had hardened.

The explanation of the good stability of the mortar according to the invention is that the surface-tension forces which prevent the air pores in fresh mortar from collapsing under the surrounding pressure at small pores or water menisci are considerably greater than the corresponding conditions for the larger ones.

Another effect which is achieved with such a fine-pored mortar as the one in question is that its workability is improved. This is explained by the fact that the small air pores, as soon as the adhesive forces have been overcome, will facilitate the displacement of the solid particles in relation to each other. As a consequence of this, the mortar will have considerably improved pouring properties. As previously stated, the fine air pores initiated in accordance with the invention are extremely well anchored in the fresh mortar at atmospheric pressure, but if the surrounding pressure is increased to such a high degree that the surface-tension forces acting upon the pores are exceeded, the entire structure will momentarily collapse when the fine pores, after the adhesive forces have been exceeded, make the solid particles so easily movable in relation to each other that it can practically be called a sheer quicksand effect. If the structure then collapses and the air leaves the system, a more complete particle contact will be achieved between the cement grains, aggregate if any, and the particle-formed material. The fine spherical particles will then particularly facilitate the movements of the extremely roughly-shaped cement grains in relation to each other. Because of this effect, cement mortar produced according to the present invention should be extremely well suited for extrusion under high pressure through a die to form products with an extremely high density and strength.

In a special fresh cement mortar produced in accordance with the present invention, the structure collapsed at an increase in pressure corresponding to 4 atmospheres overpressure.

Generally, in this connection, air pores and capability of drawing in air are mentioned. The reason for this is that the surrounding atmosphere in practically all cases will consist of air. If, for any reason, this should consist of another gas, a corresponding pore formation will be applicable. As the particle-shaped material which, according to the present invention, is incorporated into the mortar chiefly seems to function as nuclei for the fine pores, we consider it to be probable that the pore structure will be about the same with an in situ generated gas, i.e. a distribution of this into very fine gas bubbles.

DESCRIPTION OF PREFERRED EMBODIMENTS

The present invention thus relates to a method of producing an extremely fine-pored cement mortar by conveying comparatively large quantities of finely distributed air to the mortar, and with the aid of this finely distributed air by dividing up large accumulations of water in the mortar into smaller ones. The method according to the invention results in pores in the stiffened mortar of the magnitude of 5-30 μm. This is achieved by the introduction into the fresh mortar of 0.2-5.0 percent by weight counted on the cement weight of a substantially spherical, particle-shaped fine material, which is chemically inert in relation to the other components in the cement and which has a particle size of 0.1-1.0 μm, particularly 0.2-0.8 μm, and the surface properties of which show an adapted balance between hydrophilic and hydrophobic properties, as this type of particle-shaped material has proved to initiate very fine air pores when the components in the mortar are mixed with each other. The mixed hydrophilic and hydrophobic character of the particle-shaped material gives the particles unique properties which makes it possible for these to function as nuclei for dividing up large water menisci into smaller ones. It should also be entirely obvious that the particle-shaped material influences the adhesion within the air pores, as these proved to have considerably better stability than there had been reason to assume. This is particularly shown by the little tendency of the pores towards recombination. This is presumably concerned with the accumulation of particle-shaped material at the phase boundaries of the pores, which we have been able to see in a sweep electron microscope. This particle accumulation at the phase limits involves that the inner walls of the pores, after the hardening of the cement, will partly consist of this material, either in a particle form or, if the character of the particles is such that a film formation can take place, by a more or less coherent film. The accumulation at the pore walls should also to a certain extent be applicable to the capillary pores. Primarily in the case of moulded products, we have also been able to notice an accumulation of the particle-shaped material towards the outer sides of the product. All of this together gives a tight product which has very little water absorption.

As previously stated, the method according to the invention involves that rather large quantities of air are drawn into the mortar. We therefore primarily consider the method according to the invention to be suitable for producing cement mortar with a density of 1200–2000 kg/m³, which for mortar with an own density of 2300 kg/m³ (without any air whatsoever enclosed) would correspond to the air content of from about 13–14 percent by volume up towards 40 percent by volume.

The formation of pores initiated according to the invention must not be disturbed by a simultaneous or previous addition of foaming agent, e.g. free tenside, as in such a case an uncontrolled foaming would be initiated, even if the large air pores then drawn into the cement, through the influence of the particle-shaped cement are broken down into finer pores, will have a disturbing effect on the structure desired.

The particle-shaped material can be mixed with the cement as dry powder before the water is added, or can be added dispersed in the water to be mixed in. However, it is necessary to ensure that the particle-shaped material is substantially available in the form of separate particles, and that they do not stick together and form large aggregates. Because of their size, corresponding to 1/50–1/5 of the cement particles, the spherical particles in question will have their place in the empty space in the particle distribution curve which there is in a conventional cement mortar between the previously mentioned hydratation products released in the water and the actual cement particles. This should be an explanation of why the particle-shaped material does not disturb the cement structure, but rather contributes towards an improvement of it.

When mixed into the cement mortar, the particles primarily tend to be attracted to the nearest larger particles, i.e. the cement particles, and there constitute the previously mentioned nuclei for dividing up the water menisci between these cement grains themselves and between the cement grains and the aggregate particles.

A method of producing polymeric spherical, comparatively uniform particles, is through emulsion polymerization, where the polymers can be used upon acrylates, styrene, copolymer of styrene acrylate, vinyl acetate, copolymer vinyl acetate acrylate, copolymer styrene butadiene, vinylidene chloride or the like.

In order to obtain particles within the size range desired in the present connection, i.e. 0.1–1.0 μm, surface-active substances are used, the hydrophilic part of which can be anion active, non-ion active, cation active or amphoteric.

Dispersions available in the market, primarily intended for paint, glue, or other manufacture, when tested as cement additives have proved to involve an immediate change of the consistency of the fresh cement mortar, caused by a noticeably increased admixture of air. However, the effect has varied very much from case to case, at the same time as the air bubbles mixed in have been of very different sizes (between 0.1 and several mm). The tendency towards recombination between the bubbles hereby initiated also proved to be very great, at the same time as the reproducibility between different tests with the same product was poor.

This has its explanation in the comparatively high concentration of surface-active substances which are generally present in polymer dispersions, and which almost always are moreover combined with the presence of polymerizable polar substances and/or protective colloids. In such a dispersion there are thus sufficiently high concentrations of surface-active substances which are not sufficiently strongly adsorbent on the polymer surface. The part of these surface-active substances which are not adsorbed to the polymer surface in themselves give rise to air bubbles of an unstable character, which are quickly recombined or collapse.

According to the present invention, the spherical, particle-shaped material is thus to show a hydrophilic-hydrophobic balance where the particle in itself constitutes the hydrophobic part and where the quantity of non-ionic tenside which can be adsorbed in a stable way on the surface of the particle constitutes the hydrophilic part.

According to the present invention, the particle in question can then consist of a homopolymer or copolymer consisting of styrene and/or one or a plurality of esters of acrylic or methacrylic acid with the general formula in which $R_1=H$ or $CH_3$ and $R_2=$the alcohol radical with 1–8 carbon atoms, e.g. methyl acrylate, ethyl acrylate, propyl acrylate, butyl acrylate, hexyl acrylate or 2-ethyl acrylate, methyl methacrylate, ethyl methacrylate, butyl methacrylate, hexyl methacrylate, 2-ethylhexyl methacrylate. With an increased length of the chain in the alcohol radical, the hydrophobic property increases, and consideration must be taken to this when choosing the type and quantity of the hydrophilic component.

According to other variants of the invention, the particle in question can consist of a copolymer of styrene-butadiene or a copolymer of acrylate vinylidene chloride or pure vinylidene chloride or pure polyethylene.

The hydrophobic particle characteristic for the invention can also be a non-synthetized natural product, and as an example of such a product may be mentioned asphalt particles with a particle size of 0.1–0.8 μm.

The quantity of tenside which can be adsorbed in a stable way on the various particles varies somewhat between these with consideration to the size and hydrophobicity of the particles and the own hydrophilicity of the tenside.

Through practical tests, it can thus be shown that a surface-active substance has a stronger affinity towards a polymer, the more hydrophobic this is. This involves that a very hydrophobic polymer has the capability of adsorbing a greater quantity of tenside than a less hydrophobic polymer. Consideration must be taken to this in connection with the present invention, as a possible tenside quantity that can be released from the particle-shaped material has a negative effect on the pore structure of the cement mortar.

Thus, generally speaking, the tenside quantity varies between 0.1 and 5.0 percent by weight, counted on the whole of the particle-shaped material. For the polymers based on acrylic acid esters or methacrylic acid esters, and the polymers based on acrylate-vinylidene chloride, however, there are closer limits, 0.1–3.0 percent by weight. For the more hydrophobic materials asphalt, polyethylene and styrene butadiene, the wider general limits of 0.1–5.0 percent by weight are applicable. Further, the appropriate quantity of tenside within the above-mentioned limits is dependent on the particle size and type of tenside.

Examples of appropriate non-ionic tensides are oxyethylated alkyl phenol, where the number of ethylene oxide units has varied from 6–40, polyoxyethylene sorbitan monolaurate with approx. 20 units of ethylene oxide, polyoxyethylene sorbitan monopalmitate, polyoxyethylene sorbitan mono-oleate.

As examples of particle-shaped materials that have proved to function very well may be mentioned acrylic based products with a particle size of 0.2–0.6 μm and asphalt particles with a particle size of 0.1–0.8 μm.

In addition to the various methods of producing a fine-pored cement mortar as above, the present invention also comprises an application for utilizing a cement mortar produced in this way in connection with the production of a lightweight aggregate concrete with a density of less than 1400 kg/m$^3$ in which the aggregate material and the adhesive cement mortar have a pronounced different density, and the aggregate percentage of which exceeds 45–50 percent by volume. By lightweight aggregate is meant in this case aggregate material with a mean particle density of less than 1200 kg/m$^3$. In this case, the designation lightweight aggregate concrete only includes products where the cement mortar, apart from its own porosity, entirely fills out the space between the aggregate particles.

It has hitherto proved to be very difficult with the aid of cement additives available in the market to achieve a coherent and pourable lightweight aggregate concrete with a aggregate content exceeding 45–50 percent by volume. The reason for these difficulties can primarily be ascribed to the great difference in density between the cement mortar and the lightweight aggregate. The adhesive forces of the mortar have been too weak to prevent the lighter aggregate particles from separating and floating up in the mortar when the fresh concrete is being worked. A concrete with cavities is then obtained, in which the cavities between the large aggregate particles are not entirely filled out by the cement mortar. However, it is more simple to produce concrete with cavities of this type if, already from the beginning, the quantity of cement added is limited to only the quantity required for adhesion between the aggregate particles. Such products, which are primarily used for cement blocks, are produced today by many manufacturers.

When a cement block of this type is immersed in water, the spaces between the large aggregate particles are almost instantaneously filled with water. Products of the type hollow cement blocks are not comprised in the invention. They can easily be produced with conventional cement mortar.

According to the variant of the invention now in question, it has thus become possible to manufacture a lightweight aggregate concrete with a density of less than 1400 kg/m$^3$ containing preferably 80–140 liters of cement/m$^3$ concrete, 450–800 liters of lightweight aggregate/m$^3$ concrete, 0–100 liters of sand/m$^3$ concrete (the sand can be replaced by other material which may possibly be included in the bonding agent part), 100–180 liters of water/m$^3$ concrete and 0.2–5.0 percent by weight counted on the cement weight of the substantially spherical particles which are chemically inert in relation to the other components in the mortar, and which have a particle size of 0.1–1.0 μm and also consist of a hydrophobic material which has been stabilized in the particle shape in question by means of a non-ionic tenside which has been adsorbed on the surface of the particles to a content of 0.1–5.0 percent by weight counted on the quantity of particle-shaped material.

These components together give a composite in which the adhesive cement mortar through the air drawn in at the mixture has obtained a density of 1200–2000 kg/m$^3$ with a pore size of substantially 5–30 μm. However, as a rule, cement mortar with a density of less than 1600 kg/cm$^3$ obtains an altogether too low strength unless the sand fraction comprised in the mortar has been replaced by some latent hydraulic binding agent such as fly ash, finely ground granulated blast furnace slag, Puzzolans or the like. We expect the lightweight aggregate in question to have a particle density of less than 1200 kg/m$^3$ and a quantity corresponding to 40–80 percent by volume. A mixture thus produced, because of the stability of the air which is mixed in and also the fine distribution of the excess water in the mortar can be cast in a conventional way. The stability of the fresh mortar effectively prevents the aggregate particles from floating up in the mortar before this has stiffened. The reasons for this have previously been described in the text.

The spherical, particle-shaped material can consist of the previously described types.

The present invention has been defined in the accompanying claims, and will now be somewhat further described in the following examples.

In examples 1 and 2 and 4–7, the production of various types of particle-shaped materials which satisfy the conditions indicated in the patent claims are indicated, and example 3 describes the production of a particle-shaped material which because of its high tenside content does not fulfil these conditions.

Examples 8–14 refer to a cement mortar and lightweight aggregate concrete produced according to the method characteristic for the invention.

EXAMPLE 1

A 2-liter 3-necked flask provided with stirrer, reflux cooler, thermometer and intake for nitrogen gas was charged with 600 g distilled water, 4 g oxyethylated nonyl phenol with 20 units of ethylene oxide, 64 g styrene, 16 g 2-ethyl hexyl acrylate and 0.7 g ammonium persulphate. The temperature was raised to 83° C., and a polymerization was obtained. The temperature rose to 91° C. The charge was cooled to 85° C. and 1 g oxyethylated nonyl phenol with 20 units of ethylene oxide, 64 g styrene, 16 g 2-ethyl hexyl acrylate, 0.2 g ammonium persulphate were added. A reaction was obtained, and the temperature rose to 92° C. The procedure according to step 2 was repeated 3 more times. After the reaction of step 5, the temperature was held at 80° C. for 1 hour, followed by cooling to 25° C. Water in steps (2–5) was used for dissolving of the emulsifier and the initiator. Table of quantities charged as above.

Table 1

| (weights given in g) | Step 1 | Step 2 | Step 3 | Step 4 | Step 5 |
|---|---|---|---|---|---|
| Distilled water | 600 | 2 | 2 | 2 | 2 |
| Oxyethylated nonyl phenol 20EO | 4 | 1 | 1 | 1 | 1 |
| Styrene | 64 | 64 | 64 | 64 | 64 |

Table 1-continued

| (weights given in g) | Step 1 | Step 2 | Step 3 | Step 4 | Step 5 |
|---|---|---|---|---|---|
| 2-ethyl hexyl acrylate | 16 | 16 | 16 | 16 | 16 |
| Ammonium persulphate | 0.7 | 0.2 | 0.2 | 0.2 | 0.2 |
| The particle size of the polymer particles produced at the reaction described above was determined in a sweep electron microscope to be | 0.25–0.35 μm | | | | |
| The dry substance of the dispersion obtained was | 40% | | | | |

EXAMPLE 2

The procedure according to example 1 was repeated, but with the difference which will be noted from the following table.

Table 2

| (weights given in g) | Step 1 | Step 2 | Step 3 | Step 4 | Step 5 |
|---|---|---|---|---|---|
| Distilled water | 600 | 2 | 2 | 2 | 2 |
| Polyoxyethylene sorbitan monolaurate with 20EO | 2 | 0.5 | 0.5 | 0.5 | 0.5 |
| Methyl methacrylate | 48 | 48 | 48 | 48 | 48 |
| Butyl acrylate | 32 | 32 | 32 | 32 | 32 |
| Ammonium persulfate | 0.7 | 0.2 | 0.2 | 0.2 | 0.2 |
| Particle size determined in scanning microscope | 0.45 μm | | | | |
| Dry substance | 39.8 | | | | |

EXAMPLE 3

The procedure according to example 1 was repeated, but with the difference which will be noted from the following table. Reaction temperature 40°–52° C.

Table 3

| (weights given in g) | Step 1 | Step 2 | Step 3 | Step 4 | Step 5 |
|---|---|---|---|---|---|
| Distilled water | 528 | 18 | 18 | 18 | 18 |
| Oxyethylated nonyl phenol with 10 EO | 6 | 6 | 6 | 6 | 6 |
| 2-ethyl hexyl acrylate | 72 | 72 | 72 | 72 | 72 |
| Methyl methacrylate | 46 | 46 | 46 | 46 | 46 |
| Acrylic acid | 2 | 2 | 2 | 2 | 2 |
| Ammonium persulfate | 0.6 | 0.6 | 0.6 | 0.6 | 0.6 |
| Na-pyrosulfite | 0.4 | 0.4 | 0.4 | 0.4 | 0.4 |
| Particle size determined in Scanning microscope | 0.2–0.25 μm | | | | |
| Dry substance | 50.5% | | | | |

EXAMPLE 4

140 g granulate of polyethylene was charged into a 3-necked flask provided with reflux cooler, stirrer and thermometer and heated to 125° C., and the polyethylene then melted. 5.6 g oxyethylated octyl phenol with 40 units of ethylene oxide was charged and stirred 5 minutes. To 828 g water which had been heated to 95°–100° C. the melt described above was charged with vigorous stirring. The temperature was held at 90° C. for 0.5 hours, followed by cooling.

| Particle size determined in scanning microscope | 0.2–0.7 μm |
|---|---|
| Dry substance | 54.0% |

EXAMPLE 5

160 g water, 180 g asphalt with a softening point of 48°–56° C. (ASTM D-36) and 8.1 g polyoxyethylene sorbitan monostearate with 30 units of ethylene oxide was heated under pressure to 125° C. with intensive stirring, and an asphalt emulsion was then obtained. Cooling to room temperature.

| Particle size determined in scanning microscope | 0.2–0.7 μm |
|---|---|
| Dry substance | 54.0% |

EXAMPLE 6

A non-carboxylated styrene-butadiene dispersion was dialyzed to remove the tenside adsorbed on the particles. The dry content was determined, and to 100 g polymer substance, 3.5 g oxyethylated lauryl alcohol with 10 units of ethylene oxide was added during stirring.

| Particle size determined in scanning microscope | 0.28–0.37 μm |
|---|---|

EXAMPLE 7

A dispersion based upon vinylidene chloride and butyl acrylate was dialyzed to remove the tenside adsorbed on the particles. The dry content was determined, and 1 g oxyethylated cetyl alcohol with 20 units of ethylene oxide was added during stirring.

| Particle size determined in electron microscope | 0.3–0.4 μm |
|---|---|

EXAMPLE 8

(A) Standard Portland cement without aggregate additive was stirred in water in a laboratory mixer for cement testing. In order to obtain a coherent cement paste a minimum added quantity of water corresponding to a water cement ratio of 0.23 was required.

(B) The test according to A was repeated with the difference that 1.2 percent by weight counted as dry product of the particle described in example 2 was added dispersed in the water mixed in. In this case, a water cement ratio of approx. 0.18 was required in order to obtain substantially the same consistency as according to A.

(C) A pure cement paste was prepared according to A, but with the difference that the water cement ratio this time was 0.35.

When the paste had been allowed to rest a few minutes, water began to be separated on the surface of the paste, i.e. bleeding occurred.

(D) A cement paste prepared according to B, but with a water cement ratio of 0.35 did not show any tendency whatsoever towards bleeding during the time until the cement hardened.

The tests show that with the method characteristic for the invention the water required for the same consistency can be reduced, and the tendency towards bleeding can be reduced in a pure cement paste.

EXAMPLE 9

A cement mortar with the following composition was prepared according to the Swedish regulations for cement testing:

| | | |
|---|---|---|
| 500 g | standard Portland cement | |
| 500 g | standard sand | 0-0.5 mm |
| 500 g | " | 0.5-1 mm |
| 500 g | " | 1-2 mm |
| 250 g | water | |

The pore structure in this standard mortar was modified in the way indicated below.

(A) Through the addition of the quantities indicated in table 4, counted as dry polymer, of the acrylic dispersion described in example 2, the changes in the density of the mortar indicated in the table were obtained.

Table 4

| Percental additive counted on weight of cement | 0 | 1 | 2 | 4 |
|---|---|---|---|---|
| Density of mortar when fresh kg/m$^3$ | 2140 | 2000 | 1860 | 1650 |
| Percental increase of air volumes | 0 | 6 | 13 | 22 |

A characteristic feature of the air mixed in was its stable binding in the structure. The air pores formed had a diameter substantially within the range of 5-30 μm. the pore structure was studied in a sweep electron microscope. The strong binding of the air pores in the mortar will be noted from the fact that the air content was not noticeably changed when the mortar was vibrated on a vibro table for up to 10 minutes.

EXAMPLE 10

The procedure according to example 9 was repeated with particles according to examples 1, 3, 4, 5, 6 and 7. Density given in kg/m$^3$.

Table 5

| Percental additive counted on weight of cement | 1 | 2 | 4 |
|---|---|---|---|
| Particles according to | | | |
| example 1 | 2000 | 1840 | 1630 |
| example 3 | 1600 | 1550 | 1480 |
| example 4 | 1950 | 1840 | 1650 |
| example 5 | 1890 | 1800 | 1530 |
| example 6 | 1900 | 1810 | 1620 |
| example 7 | 1870 | 1780 | 1510 |

A characteristic feature of the mortar to which particles according to examples 1, 4, 5, 6 and 7 had been added was that the air mixed in was very stable. The air content was not changed when the mortar was vibrated on a vibro table for 10 minutes. The particles according to example 3, when the corresponding quantity had been added, had a good air admixing effect, but the mortar obtained showed poor cohesion at vibration, and a tendency towards separation. Further, the air content was changed. The mortar to which particles according to 1, 4, 5, 6 and 7 had been added proved to have air pores within the range of 5-30 μm while the mortar according to example 3 contained air pores within the range of 50-250 μm.

EXAMPLE 11

In a concrete mixer, a lightweight aggregate concrete with the following composition was prepared.

| | | Kg | Liters |
|---|---|---|---|
| Cement (standard Portland) | | 350 | 112 |
| Lightweight aggregate | 0-5 mm$^x$ | 180 | 200 |
| Lightweight aggregate | 5-10 mm$^x$ | 240 | 400 |
| Sand 0-2 mm | | 265 | 100 |
| Water | | 150 | 150 |

$^x$Lightweight aggregate of type ball-sintered clay.

Lightweight aggregate 5-12 mm, lightweight aggregate 0-5 mm, cement and sand were charged in the order mentioned, followed by dry mixing for 1 minute. Water together with particles, the quantity and type of which will be noted from the summary below, was added and mixed for 3 minutes. The concrete was poured into an open mould and vibrated. The following judging scale was used for the casting tests.

Casting properties and cohesion
1 = No cohesion whatsoever. At vibration, mixture segregates and lightweight aggregate leaves the system.
2 = Certain cohesion, but tendency towards separation can be noted.
3 = Very good cohesion, no tendency towards separation.

Consistency

For the measuring of the consistency in lightweight aggregate concrete, a method is proposed which is described in the German DIN standard (1048-1972). The equipment consists of a spreading table 70×70 cm. The table should have a weight of 16 kg and one edge should have a lifting height limited to 4 cm.

On the table, a truncated cone of concrete is formed using a mould with a height of 20 cm and an upper and lower diameter of 13 and 20 cm. The mould is set on the middle of the table and the concrete is compressed with a rod. The cone is filled in two layers of equal height, and each layer is packed with 10 blows with the rod. The mould is removed from the cone after one-half minute. Thereafter, with the aid of the handle, the table is allowed to fall within the working range 15 times during 15 seconds. The spreading is thereafter measured in two directions at right angles and is indicated in cm. The cohesion and separation tendencies of the concrete can also be determined ocularly.

| Type of additive | % additive counted on cement weight (solid substance) | Consistency (spread in cm) | Cohesion Casting properties |
|---|---|---|---|
| — | 0 | X | 1 |
| Particles according to | | | |
| Example 1 | 1.2 | 31-33 | 3 |
| " | 1.5 | 33-35 | 3 |
| " | 3.5 | 35-37 | 3 |
| Particles | | | |

-continued

| Type of additive | % additive counted on cement weight (solid substance) | Consistency (spread in cm) | Cohesion Casting properties |
|---|---|---|---|
| according to Example 2 | 0.9 | 29-31 | 3 |
| " | 1.3 | 32-34 | 3 |
| Particles according to Example 3 | 1.0 | 33-35 | 1.5-2 |
| particles according to Example 5 | 0.8 | 28-30 | 3 |
| " | 1.1 | 31-33 | 3 |
| Particles according to Example 4 | 1.6 | 33-34 | 3 |
| Barra 55L | 0.15 | 35-36 | 1 |
| Barra 55L | 0.6 | 36-37 | 1 |
| UCR | 0.03 | 33-34 | 1 |
| Sodium lauryl sulfate | 0.4 | 36-38 | 1 |
| Adduct ethylene oxide nonyl phenol (20EO) | 0.5 | 34-37 | 1 |
| Adduct ethylene oxide lauryl alcohol (10EO) | 1.0 | 33-36 | 1 |

BARRA 55L is a commercial product marketed as an air entraining agent. Its function is primarily to be considered to be of the tenside type. Recommended quantities to be added are at 50 cm$^3$/100 kg cement, i.e. approx. 0.5°/oo.
UCR is a commercial product which is considered to give a mortar with better cohesion (water thickener) and thereby prevent separation between mortar and ballast. The main component in UCR is considered to be polyethylene oxide.

Consistency is changed immediately at the use of Barra 55 L, the tensides described and particles according to the invention. This appears in the form of an increased spread at the test of the consistency. No cohesive effect whatsoever was obtained at the use of Barra, UCR or tensides. Particles according to example 3 with the higher tenside content compared with particles according to the invention tended to be better, but proved to have a comparatively larger air pore size. The poor cohesion must be ascribed to the high tenside content and the carboxyl content of the particles, which gives poorer affinity of the tenside to the particle.

Examples 12-14 describe different lightweight aggregate compositions with a constant volume of light ballast (65 percent by volume) and a varying quantity of cement in the mortar. The compositions used in the respective examples tested will be noted from the following tables. Without extra additives, all of the mixtures were considered to be difficult to cast.

EXAMPLE 12

|  | Kg | Liter |
|---|---|---|
| Cement | 250 | 80 |
| Lightweight aggregate 0-3 mm | 175 | 163 |
| Lightweight aggregate 3-20 mm | 195 | 325 |
| Lightweight aggregate 10-20 mm | 85 | 162 |
| Sand 0-2 mm | 239 | 90 |
| Water | ≈180 | ≈180 |

EXAMPLE 13

|  | Kg | Liter |
|---|---|---|
| Cement Std | 314 | 100 |
| Lightweight aggregate 0-3 mm | 175 | 163 |
| Lightweight aggregate 3-10 mm | 85 | 162 |
| Sand 0-2 mm | 186 | 70 |
| Water | ≈180 | ≈180 |

EXAMPLE 14

|  | Kg | Liter |
|---|---|---|
| Cement Std | 377 | 120 |
| Lightweight aggregate 0-3 mm | 175 | 163 |
| Lightweight aggregate 3-10 mm | 195 | 325 |
| Lightweight aggregate 10-20 mm | 80 | 162 |
| Sand 0-2 mm | 133 | 50 |
| Water | ≈180 | ≈180 |

The fresh mixtures were thereafter modified according to the method characteristic for the invention by the addition of the particle-shaped material described in example 1. Various quantities between 0 and 2% additive were tested. With an increased cement content and quantity of additive, better casting properties were obtained. The pressure strength of the compositions tested was checked after 28 days, at the same time as the bulk density was determined.

Figure 1:
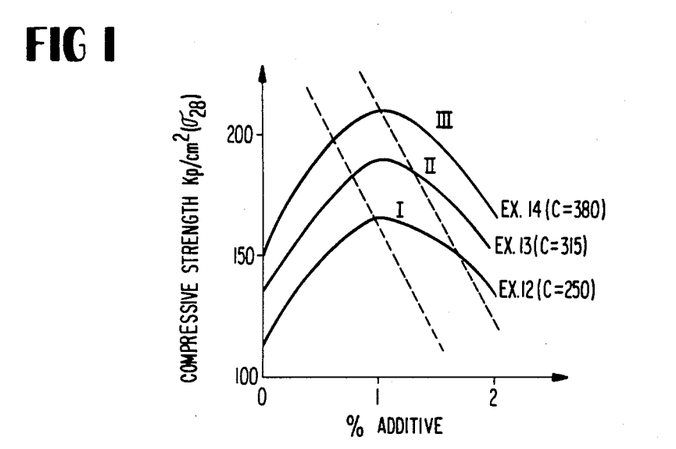
FIG. 1 is a graph of pressure strength for varying amounts of an additive employed in the present invention in Examples 12, 13, and 14.
Figure 2:
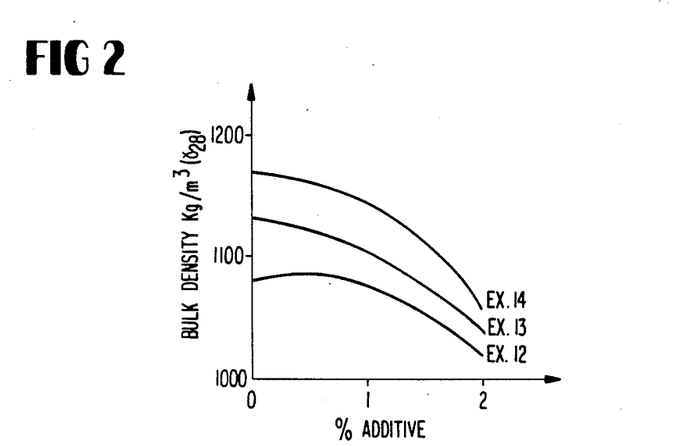
FIG. 2 is a graph of bulk density for varying amounts of an additive employed in the present invention in Examples 12, 13, and 14.
Figure 3:
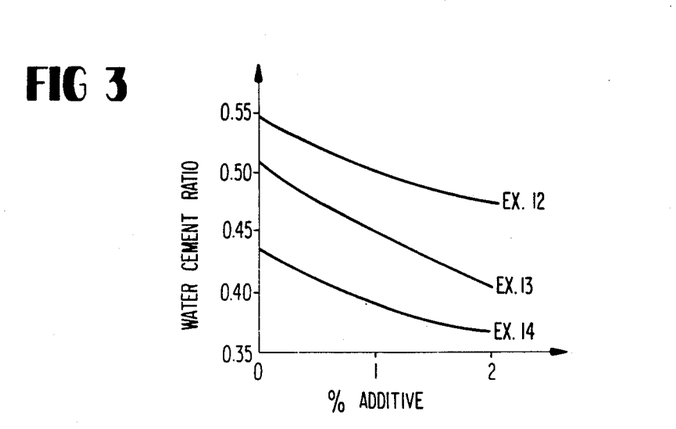
FIG. 3 is a graph of water-cement ratio for varying amounts of an additive employed in the present invention in Examples 12, 13, and 14.

The values then measured are shown in the diagrams in FIGS. 1 and 2. All of the values refer to well compacted mixtures. The water cement ratio of the various compositions is shown in FIG. 3. In FIG. 1, ranges I, II and III have been indicated. These show the approximate limits for Range I: concrete which cannot be cast Range II: concrete which can be cast but which, however, can segregate, i.e. a separation of the aggregate can take place.

Range III: concrete which can be cast without any tendencies towards segregation.

From FIGS. 1 and 2 it will be noted that with small contents of additives within range I, particularly with small quantities of cement, a remarkably low bulk density is obtained. This is explained by the great inner friction of these mixtures, which prevents a compression of the cast mass. The low density thus refers to the comparatively large compression pores, and not the finely distributed mixed-in air.

We claim:

1. A method for producing a cement mortar containing cement, solid particles and water and having finely distributed gas in the mortar in an amount sufficient to provide said mortar with a density of 1200-2000 kg/m$^3$ which comprises introducing into the mortar prior to setting thereof 0.2-5.0 percent by weight based upon the quantity of cement of a particle-shaped hydrophilic-hydrophobic balanced product chemically inert in relation to the rest of the mortar and consisting of substantially spherical hydrophobic particles of 0.1-1.0 μm strongly adsorbed on the surface of which is a hydrophilic nonionic tenside in amount of 0.1-5.0 percent by weight based on the total weight of said product.

2. The method of claim 1 which comprises introducing into said mortar a particle-shaped product of a homopolymer or copolymer of styrene, or at least one ester of acrylic or methacrylic acid, or copolymer of styrene and said ester wherein said ester has the formula:

in which $R_1$=H or $CH_3$ and $R_2$=an alcohol radical with 1-8 carbon atoms with a particle size of 0.2-0.6 μm having adsorbed on its surface 0.1-3.0 percent by weight of nonionic tenside.

3. The method of claim 2 wherein said ester is methyl acrylate or ethyl acrylate or propyl acrylate or butyl acrylate or hexyl acrylate or 2-ethyl hexyl acrylate or methyl methacrylate or ethyl methacrylate or butyl methacrylate or hexyl methacrylate or 2-ethyl hexyl methacrylate or mixtures thereof.

4. The method of claim 1 which comprises introducing into said mortar a particle-shaped product of a copolymer of vinylidene chloride and acrylic acid ester or a homopolymer of vinylidene chloride having adsorbed on its surface of 0.1-3.0 percent by weight of nonionic tenside.

5. The method of claim 1 which comprises introducing into said mortar a particle-shaped product of a copolymer of styrene-butadiene having adsorbed on its surface 0.1-5.0 percent by weight of nonionic tenside.

6. The method of claim 1 which comprises introducing into said mortar a particle-shaped product of polyethylene with a particle size of 0.2-0.6 μm.

7. The method of claim 1 wherein said spherical hydrophobic particles are of a natural product.

8. The method of claim 7 wherein said natural product is asphalt having a particle size of 0.1-0.8 μm.

9. The method of claim 1 which comprises initiating drawing in of finely distributed air into said mortar by introducing said particle-shaped product.

10. The method of claim 1 wherein said solid particles are sand.

11. The method of claim 1 wherein said cement is Portland cement.

12. The method of claim 1 wherein said cement is aluminate cement.

13. The method of claim 1 wherein said cement is slag cement.

14. A cement mortar obtained by the method of claim 1.

15. A method for producing a light aggregate concrete of density less than 1400 kg/m³ from a cement mortar comprised of cement, solid particles, and water and having finely distributed gas in the mortar in an amount sufficient to provide said mortar with a density of 1200-2000 kg/m³, and 45-80 percent by volume of a light aggregate material with a particle density of less than 1200 kg/m³ wherein the cement mortar entirely fills out the space between the aggregate particles which comprises initiating of distribution of said finely distributed gas in said mortar by incorporating prior to admixing said light ballast with said cement mortar 0.2-5.0 percent by weight based upon the amount of said cement in said mortar of a particle-shaped hydrophilic-hydrophobic balanced product chemically inert in relation to the rest of said mortar and consisting of substantially spherical hydrophobic particles of 0.1-1.0 μm strongly adsorbed on the surface of which is a hydrophilic nonionic tenside in amount of 0.1 to 5.0 percent by weight based on the total weight of said product.

16. The method of claim 15 which comprises introducing into said mortar a particle-shaped product of a homopolymer or copolymer of styrene, or at least one ester of acrylic or methacrylic acid, or copolymer of styrene and said ester wherein said ester has the formula:

in which $R_1$=H or $CH_3$ and $R_2$=an alcohol radical with 1-8 carbon atoms with a particle size of 0.2-0.6 μm having adsorbed on its surface 0.1-3.0 percent by weight of nonionic tenside.

17. The method of claim 16 wherein said ester is methyl acrylate or ethyl acrylate or propyl acrylate or butyl acrylate or hexyl acrylate or 2-ethyl hexyl acrylate or methyl methacrylate or ethyl methacrylate or butyl methacrylate or hexyl methacrylate or 2-ethyl hexyl methacrylate or mixtures thereof.

18. The method of claim 15 which comprises introducing into said mortar a particle-shaped product of a copolymer of vinylidene chloride and acrylic acid ester or a homopolymer of vinylidene chloride having adsorbed on its surface of 0.1-3.0 percent by weight of nonionic tenside.

19. The method of claim 15 which comprises introducing into said mortar a particle-shaped product of a copolymer of styrene-butadiene having adsorbed on its surface 0.1-5.0 percent by weight of nonionic tenside.

20. The method of claim 15 which comprises introducing into said mortar a particle-shaped product of polyethylene with a particle size of 0.2-0.6 μm.

21. The method of claim 15 wherein said spherical hydrophobic particles are of a natural product.

22. The method of claim 21 wherein said natural product is asphalt having a particle size of 0.1-0.8 μm.

23. The method of claim 15 which comprises initiating drawing in of finely distributed air into said mortar by introducing said particle-shaped product.

24. The method of claim 15 wherein said solid particles are sand.

25. A light aggregate concrete obtained by the method of claim 15.

26. A method for producing a hardened cement mortar wherein the major portion of all pores thereof are 5-30 μm containing cement, solid particles and water and having finely distributed gas in the mortar in an amount sufficient to provide said mortar with a density of 1200-2000 kg/m³ which comprises introducing into the mortar prior to setting thereof 0.2-5.0 percent by weight based upon the quantity of cement of a particle-shaped hydrophilic-hydrophobic balanced product chemically inert in relation to the rest of the mortar and consisting of substantially spherical hydrophobic particles of 0.1-1.0 μm strongly adsorbed on the surface of which is a hydrophilic nonionic tenside in amount of 0.1-5.0 percent by weight based on the total weight of said product, and allowing the composition to harden.

27. A cement mortar comprising cement, solid particles, water, finely distributed gas in an amount to provide said mortar with a density of 1200-2000 kg/m³, and 0.2-5.0 percent by weight based upon the quantity of said cement of a particle-shaped hydrophilic-hydrophobic balanced product chemically inert to the rest of the mortar and consisting of substantially spherical hydrophobic particles of 0.1-1.0 μm strongly adsorbed on the surface of which is a hydrophilic nonionic tenside in amount of 0.1–5.0 percent by weight based on the total weight of said product.

28. A light aggregate concrete of density less than 1400 kg/m³ from a cement mortar comprised of cement, solid particles, and water and having finely distributed gas in the mortar in an amount sufficient to provide said mortar with a density of 1200–2000 kg/m³, and 45–80 percent by volume of a light aggregate material with a particle density of less than 1200 kg/m³ wherein the cement mortar entirely fills out the space between the aggregate particles and 0.2–5.0 percent by weight based upon the amount of said cement in said mortar of a particle-shaped hydrophilic-hydrophobic balanced product chemically inert in relation to the rest of said mortar and consisting of substantially spherical hydrophobic particles of 0.1–1.0 μm strongly adsorbed on the surface of which is a hydrophilic nonionic tenside in amount of 0.1 to 5.0 percent by weight based on the total weight of said product.

* * * * *